: 2,828,303

2,828,303

MIXED CELLULOSE ESTERS CONTAINING ISOBUTYRYL GROUPS

Carl J. Malm and Loring W. Blanchard, Jr., Rochester, N. Y., assignors to Eastman Kodak Company, Rochester, N. Y., a corporation of New Jersey No Drawing. Application June 7, 1954
Serial No. 435,042

8 Claims. (Cl. 260—225)

This invention relates to the manufacture of mixed esters of cellulose containing isobutyryl groups, particularly cellulose acetate isobutyrate, of good viscosity in which the isobutyration is carried out in substantially the complete absence of other fatty acid radicals initially whereupon an acylating agent to provide other desired acyl groups is added to the esterification mass.

Cellulose mixed esters such as of the cellulose acetate propionate and cellulose acetate n-butyrate type are usually made by treating cellulose with a mixture of acids and anhydrides. However, when the preparation of cellulose acetate isobutyrate is attempted by any method by which a product of good viscosity may be obtained only a small amount of isobutyryl is imparted to the cellulose due to the low rate of reactivity of isobutyric anhydride, this being due to the great difference of reactivity between isobutyric anhydride and other lower fatty acid anhydrides such as acetic anhydride. A method of preparing cellulose acetate isobutyrate has been described in Malm and Fletcher U. S. Patent No. 2,024,651 but there a sulfuric acid catalyst is used and 60–80% of the acyl present in the esterification mixture is isobutyryl. Only relatively small amounts of isobutyryl are combined with the cellulose and in spite of the fact that an appreciable lowering of the viscosity of the cellulose material results, the conditions in the esterification process described in that patent are such that the cellulose ester does not dissolve in the esterification bath.

One object of our invention is to provide a method of making cellulose acetate isobutyrate or other mixed cellulose esters having a high isobutyryl content and sufficiently high viscosity to give products of good physical properties. Another object of our invention is to provide a method of preparing mixed esters of cellulose containing isobutyryl in which the desired amount of isobutyryl is in part imparted to the cellulose prior to the addition of other acyl thereto. Other objects of our invention will appear herein.

We have found that cellulose acetate isobutyrates of good viscosity and uniformity and of high isobutyryl contents can be prepared if a cellulose having an activation value of at least 0.2 is reacted with isobutyric anhydride and zinc chloride catalyst in the first part of the esterification. After a substantial isobutyryl content has been imparted to the cellulose, some other acyl supplying compound such as acetic anhydride or acid is added and the esterification is carried to completion. We have found that in the event of hydrolysis of the resulting cellulose ester, acetyl groups are removed much more readily than isobutyryl groups and that an isobutyric acid ester of cellulose having the desired hydroxyl content can be readily obtained without degradation of the cellulose ester or reduction of its viscosity.

The cellulose employed as the starting material in preparing cellulose esters in accordance with our invention is first activated to impart thereto an activation value of at least 0.2 as referred to in the article of Malm et al. in Industrial and Engineering Chemistry, December 1952, vol. 44, page 1904. This value is determined by the rate in degrees C. per minute at which one part of the cellulose is acetylated adiabatically with 10 parts of acetic anhydride and 20 parts of acetic acid with stirring at a temperature of 20° C. using a ratio of 0.072 mol of sulfuric acid catalyst per 100 grams of cellulose. The preferred method of activating cellulose in the preparation of mixed esters in accordance with our invention is by first treating the cellulose with water, displacing the water from the cellulose with acetic acid and the acetic acid therefrom with isobutyric acid which method of activation of cellulose is described and claimed in U. S. Patent No. 2,622,080 of Richter et al. Other methods of activating cellulose to the desired activation value may be used however such as by treating the cellulose with 10% NaOH solution followed by washing with water, removing the water with acetic acid and the acetic acid with isobutyric acid. Another useful method of activating cellulose involves treating it with 75% aqueous acetic acid and removing the acetic acid with isobutyric acid. Any method of activating cellulose which imparts an activation value of at least 0.2 may be employed. The material used in treating the cellulose should be removed, the last removal step using isobutyric acid as a displacing agent prior to the esterification proper. It is preferable that the activated cellulose employed have a cuprammonium viscosity of at least 1000 cps.

The activated cellulose containing isobutyric acid is mixed with isobutyric anhydride and zinc chloride so that the isobutyric anhydride constitutes at least 60% of the liquid portion of the mass, other acyl groups than isobutyryl are absent, the zinc chloride is at least 20% and preferably at least 50% of the weight of the cellulose and the liquid to cellulose ratio of the mass is not more than 8:1. Preferably the isobutyric anhydride constitutes at least 80% of the esterification bath initially. The isobutyration is carried out at a temperature of 120–150° F. although in some cases the use of a temperature within the range of 100–120° F. might be desirable. The esterification is carried out only so long as desirable to introduce a substantial content of isobutyryl groups into the cellulose and then some other lower fatty acid compound such as acetic anhydride or acetic acid is added and the esterification is carried to completion. Instead of acetic anhydride or acid there may be added propionic anhydride or acid or normal butyric anhydride or acid such as in a proportion of 5–20% of the esterification bath, after some isobutyryl esterification of the cellulose has occurred. In general at least ½ OH per $C_6$ unit of cellulose is esterified by iso-butyryl before other fatty acid compounds are added to the esterification. The mixed ester may be hydrolyzed such as by the method described in Hiatt, Blanchard and Tanghe application Ser. No. 435,044 filed of even date.

For the preparation of cellulose esters of high viscosity it is desirable to use as the catalyst zinc chloride within the range of 20–75% based on the weight of the cellulose. By using proportions of zinc chloride in the higher part of the range and temperatures having a peak of 140° F. or more in the isobutyration portion of the esterification, especially substantial isobutyryl contents are imparted to the cellulose.

The following examples illustrate our invention:

Example 1

300 parts of acetylation grade cotton linters were soaked in water having a temperature of 80° C. for ½ hour. The water was then removed from the cellulose by centrifuging and displacement with glacial acetic acid, and then isobutyric acid as the displacing liquid. The activated cellulose mass consisting of 300 parts of cellulose and 255 parts of isobutyric acid was placed in a Werner-Pfleiderer mixer together with 1300 parts of isobutyric anhydride and 150 parts of zinc chloride. The mixer was run for 2 hours with the jacket temperature of 130° F. whereupon 200 parts of acetic anhydride were added thereto and the jacket temperature of the mixture was dropped to and maintained at 120° F. The complete reaction required 9 hours giving a solution free of grain and fiber. The temperature of the reaction mass during the esterification ranged from 120 to 130° F.

A series of similar batches were made adding the acetic anhydride after varying times of initial esterification with isobutyric anhydride. The times of the acetic anhydride addition and the acetyl content of the finished product are as follows:

| Time of Ac$_2$O Addition in Hours After Start of Esterification | Percent Acetyl in cellulose acetate isobutyrate obtained |
|---|---|
| 0 | 17.4 |
| 2 | 14.1 |
| 5.25 | 7.3 |
| 7.0 | 1.7 |

The relative contents of acetyl and isobutyryl in the final product may be predetermined by the time of addition of the acetic anhydride after the start of the esterification. In each of the series of esterifications listed the complete time employed in the preparation of the cellulose ester was 9 hours.

*Example 2*

Several esterifications of cellulose were carried out in which 364 parts of esterification grade cellulose was employed. In every case the cellulose was activated by soaking in water at 150° F. and dewatered with one change of acetic acid and 3 changes of isobutyric acid. After a final centrifuging an activated cellulose was obtained containing 0.8 part of isobutyric acid per part of cellulose. The cellulose in each case was then esterified using zinc chloride catalyst in an amount of 50% based on the weight of the cellulose and an initial liquid to cellulose ratio of 4.7:1. The total amount of anhydride employed in each esterification was the equivalent of 4 parts of isobutyric anhydride per part of cellulose. During the esterification the jacket temperature was held at 130° F. and the esterifications were completed in the times given. In one set of esterifications, Nos. 1, 4, 7, the acetic anhydride was mixed with the esterification mass initially. In a second set of esterifications, numbers 2, 5 and 8, the acetic anhydride was added after the esterification had proceeded for one hour while in a third set of esterifications, 3, 6, 9, the acetic anhydride was added after the esterification has proceeded for 2 hours. The proportions and conditions in each esterification mass were as follows:

| | Ac$_2$O Added | Isobutyric Acid | Isobutyric Anhydride | Acetic Anhydride | Reaction Time In Hours | Acetyl Wt. percent | Acetyl Mol percent | Parts Isobutyric Anhydride per pt. cellulose |
|---|---|---|---|---|---|---|---|---|
| 1 | Start | 317 | 1,270 | 118 | 8 | 6.7 | 10.2 | 3.5 |
| 2 | 1 hr | 313 | 1,270 | 118 | 8.5 | 6.7 | 10.2 | 3.5 |
| 3 | 2 hrs | 313 | 1,270 | 118 | 8 | 6.7 | 10.2 | 3.5 |
| 4 | Start | 421 | 1,095 | 235 | 8 | 13.0 | 19.8 | 3.0 |
| 5 | 1 hr | 370 | 1,095 | 235 | 8 | 13.4 | 20.4 | 3.0 |
| 6 | 2 hrs | 370 | 1,095 | 235 | 7 | 13.4 | 20.4 | 3.0 |
| 7 | Start | 440 | 910 | 355 | 7 | 20.3 | 29.6 | 2.5 |
| 8 | 1 hr | 435 | 910 | 355 | 8 | 20.4 | 29.8 | 2.5 |
| 9 | 2 hrs | 435 | 910 | 355 | 7 | 20.4 | 29.8 | 2.5 |

The completion of the reaction was shown by the complete dissolving of the resulting ester in the esterification mass. The cellulose ester obtained was precipitated by diluting the mass with aqueous acetic acid and then introducing it into agitated water or dilute aqueous acetic acid. The values obtained of the various products were those shown in the following table, which indicates that a greater isobutyryl content and a smaller moisture regain results when the addition of acetic anhydride to the esterification mass is delayed until isobutyrylation has first occured:

| | Ac$_2$O Added | Intrinsic Viscosity In Acetic Acid | Groups per glucose unit OH | Groups per glucose unit Acetyl | Groups per glucose unit Isobutyryl | Percent of radicals by weight Acetyl | Percent of radicals by weight Isobutyryl | Apparent Acetyl (percent) | Moisture Regain at 95% R. H. |
|---|---|---|---|---|---|---|---|---|---|
| 1 | Start | 1.98 | .06 | 0.93 | 2.01 | 11.7 | 41.8 | 37.0 | 2.4, 2.4 |
| 2 | 1 hr | 1.78 | .06 | 0.84 | 2.10 | 10.5 | 43.3 | 36.7 | 2.3, 2.6 |
| 3 | 2 hrs | 1.95 | .06 | 0.75 | 2.19 | 9.3 | 44.8 | 36.5 | 1.6, 2.0 |
| 4 | Start | 2.19 | .03 | 1.54 | 1.43 | 20.3 | 31.0 | 39.0 | 2.7, 3.1 |
| 5 | 1 hr | 1.98 | .02 | 1.37 | 1.61 | 17.7 | 34.6 | 38.6 | 1.8, 2.1 |
| 6 | 2 hrs | 2.19 | .03 | 1.19 | 1.78 | 15.2 | 37.6 | 37.9 | 2.1, 2.1 |
| 7 | Start | 2.31 | .05 | 1.94 | 1.01 | 26.5 | 22.8 | 440.3 | 3.7, 3.8 |
| 8 | 1 hr | 2.19 | .02 | 1.65 | 1.33 | 21.9 | 29.0 | 39.5 | 3.0, 2.9 |
| 9 | 2 hrs | 2.28 | .03 | 1.46 | 1.51 | 19.1 | 32.5 | 38.8 | 2.2, 2.8 |

The moisture regain of the material is determined by taking a ground sample of the cellulose ester such as of on the order of 3 grams, drying the sample thoroughly, weighing the same and then exposing to an atmosphere of 95% relative humidity in a room of approximately 80° F. for 8 days. The material is then again weighed and the percentage of increase in weight indicates the moisture regain of the material.

We claim:

1. A process for preparing mixed lower fatty acid esters of cellulose containing isobutyryl groups which comprises initially reacting upon cellulose having an activation value of at least 0.2 with an esterification bath essentially consisting of isobutyric anhydride and zinc chloride catalyst which bath is substantially free of acyls other than isobutyryl at a temperature within the range of 100–150° F.; and after a substantial isobutyryl content has been imparted to the cellulose adding additionally to the esterification bath a lower fatty acid compound selected from the anhydrides and acids of the fatty acids of 2-4 carbon atoms in an amount 5-20% of the bath and continuing the esterification until the cellulose has been substantially, completely esterified and is in solution in the bath.

2. A process for preparing cellulose acetate isobutyrates which comprises initially esterifying cellulose having an activation value of at least 0.2 with an esterification bath essentially consisting of isobutyric anhydride and zinc chloride catalyst which bath is substantially free of acyls other than isobutyryl at a temperature within the range of 100-150° F.; and after a substantial isobutyryl content has been imparted to the cellulose adding to the esterification bath an acetic compound selected from the group consisting of its acid and anhydride in an amount 5-20% of the bath and continuing the esterification until the cellulose has been substantially, completely esterified and is in solution in the bath.

3. A process of preparing cellulose acetate isobutyrate which comprises reacting upon cellulose having an activation value of at least 0.2 with an esterification bath essentially consisting of isobutyric anhydride and zinc chloride catalyst which bath is substantially free of acyls other than isobutyryl at a temperature within the range of 100-150° F.; and after a substantial isobutyryl content has been imparted to the cellulose adding to the esterification bath acetic anhydride in an amount 5-20% of the bath and continuing the esterification until the cellulose has been substantially, completely esterified and is in solution in the bath.

4. A method of preparing mixed lower fatty acid esters of cellulose containing isobutyryl groups which comprises reacting upon cellulose having an activation value of at least 0.2 with an esterification bath having an isobutyric anhydride content of at least 60% of the liquid portion and a zinc chloride content of at least 20% based on the weight of the cellulose from which bath all other acyl than isobutyryl is absent at a temperature within the range of 100-150° F.; and after a substantial isobutyryl content has been imparted to the cellulose adding to the esterification bath a lower fatty acid compound selected from the group consisting of the acids and anhydrides of the fatty acids of 2-4 carbon atoms in the proportion of 5-20% of the esterification bath and continuing the esterification until the cellulose has been substantially, completely esterified and is in solution in the bath.

5. A process of preparing cellulose acetate isobutyrates which comprises reacting upon cellulose having an activation value of at least 0.2 with an esterification bath essentially consisting of isobutyric anhydride and zinc chloride catalyst which bath is substantially free of acyl other than isobutyryl, the isobutyric anhydride constituting at least 60% of the liquid portion of the bath and the zinc chloride being present in an amount of at least 20% based on the weight of the cellulose at a temperature within the range of 100-150° F.; and after a substantial isobutyryl content has been imparted to the cellulose adding to the bath acetic anhydride in an amount to constitute 5-20% of the esterification bath and continuing the esterification until the cellulose is substantially, completely esterified and is in solution in the bath.

6. A process of preparing cellulose acetate isobutyrate which comprises the steps of soaking cellulose in water to swell the same, displacing the water with acetic acid and the acetic acid with isobutyric acid, mixing with the cellulose so obtained isobutyric anhydride and zinc chloride catalyst which bath is substantially free of acyl other than isobutyryl and esterifying the cellulose therewith at a temperature within the range of 100-150° F.; to a point where the cellulose contains a substantial isobutyryl content, then adding to the mass acetic anhydride in an amount to constitute 5-20% of the total bath and continuing the esterification until the cellulose is substantially completely esterified and is in solution in the bath.

7. A process of preparing cellulose acetate isobutyrate which comprises soaking cellulose in water for a time sufficient to swell the same, displacing the water therefrom with acetic acid and the acetic acid with isobutyric acid, mixing the resulting cellulose, wet with isobutyric acid, with an esterification bath essentially consisting of isobutyric anhydride and zinc chloride catalyst, at least 80% of the esterification bath being isobutyric anhydride, other acyl than isobutyryl being absent, and the zinc chloride constituting at least 20% based on the weight of the cellulose, reacting upon the cellulose at a temperature within the range of 100-150° F.; until at least ½ hydroxyl group per $C_6$ unit of cellulose has been isobutyrylated and then adding to the bath acetic anhydride in an amount sufficient to constitute 5-20% of the esterification bath and continuing the esterification until the cellulose has been substantially, completely esterified and is in solution in the bath.

8. A process of preparing cellulose acetate isobutyrate which comprises soaking cellulose in water for ½ hour, displacing the water with glacial acetic acid and the acetic acid with isobutyric acid, reacting upon the so treated cellulose with an esterification bath of isobutyric anhydride and zinc chloride catalyst which bath is substantially free of acyl other than isobutyryl at a temperature within the range of 100-150° F.; for a period of 1 hour, then adding acetic anhydride to the esterification mass and continuing the esterification until the cellulose is substantially, completely esterified and is in solution in the bath.

References Cited in the file of this patent

UNITED STATES PATENTS

| | | |
|---|---|---|
| 2,024,651 | Malm et al. | Dec. 17, 1935 |
| 2,353,423 | Tinsley | July 11, 1944 |
| 2,362,576 | Malm | Nov. 14, 1944 |
| 2,373,630 | Martin et al. | Apr. 10, 1945 |
| 2,376,422 | Dreyfus | May 22, 1945 |
| 2,622,080 | Richter et al. | Dec. 16, 1952 |